United States Patent [19]

Bower

[11] Patent Number: 4,995,106
[45] Date of Patent: Feb. 19, 1991

[54] FAST DECISION FEEDBACK DECODER FOR DIGITAL DATA

[75] Inventor: Dan E. Bower, Newark, Calif.

[73] Assignee: Ampex Corporation, Redwood City, Calif.

[21] Appl. No.: 398,191

[22] Filed: Aug. 24, 1989

[51] Int. Cl.[5] .............................................. H04L 25/06
[52] U.S. Cl. ...................................... 375/76; 328/116; 375/94
[58] Field of Search ............... 375/14, 76, 82, 94, 375/95, 101; 360/39, 40; 329/311; 328/108, 115, 116, 119, 164

[56] References Cited

U.S. PATENT DOCUMENTS

| | | | |
|---|---|---|---|
| 3,125,727 | 3/1964 | Sharp | 328/116 |
| 3,456,201 | 7/1969 | Zrubek | 328/116 |
| 3,634,769 | 1/1972 | Sleater et al. | 328/103 |
| 3,898,572 | 8/1975 | Kato | 328/103 |
| 4,012,697 | 3/1977 | Ballinger | 375/110 |
| 4,344,039 | 8/1982 | Sugiura et al. | 375/94 |
| 4,371,975 | 2/1983 | Dugan | 307/516 |
| 4,543,531 | 9/1985 | Sugita et al. | 375/80 |
| 4,546,394 | 10/1985 | Yamamoto | 375/95 |
| 4,636,859 | 1/1987 | Vernhet | 375/94 |
| 4,639,792 | 1/1987 | Moxon | 360/55 |
| 4,697,098 | 9/1987 | Cloke | 328/116 |
| 4,703,282 | 10/1987 | Yoshida | 375/80 |
| 4,707,666 | 11/1987 | Pfeifer et al. | 375/80 |
| 4,767,997 | 8/1988 | Nielsen | 328/116 |
| 4,779,054 | 10/1988 | Monteleone et al. | 375/94 |

*Primary Examiner*—Benedict V. Safourek
*Attorney, Agent, or Firm*—Elizabeth E. Strnad

[57] ABSTRACT

The decision feedback decoder of the invention receives sequentially digital values corresponding to a data stream transmitted by a signal transmission channel. The decoder has two parallel signal paths. The first path has a first logic circuit which receives every other digital value corresponding to every other data bit of the transmitted data stream, and it provides and outputs subsequent decisions determining the values of these corresponding bits. The second path has a second logic circuit which receives sequentially all the digital values corresponding to all the data bits of the stream. During the time of providing each decision by the first logic circuit, the second logic circuit provides two subsequent decisions determining the respective values of two subsequent bits, but it outputs only every other decision, which alternates with the decisions provided by the first logic circuit. A predetermined number of previous decisions is stored and fed back to both logic circuits for use in the decision making process. The resulting rate the decisions output by the decoder of the invention is approximately doubled over the rate of known decision feedback decoders.

16 Claims, 6 Drawing Sheets

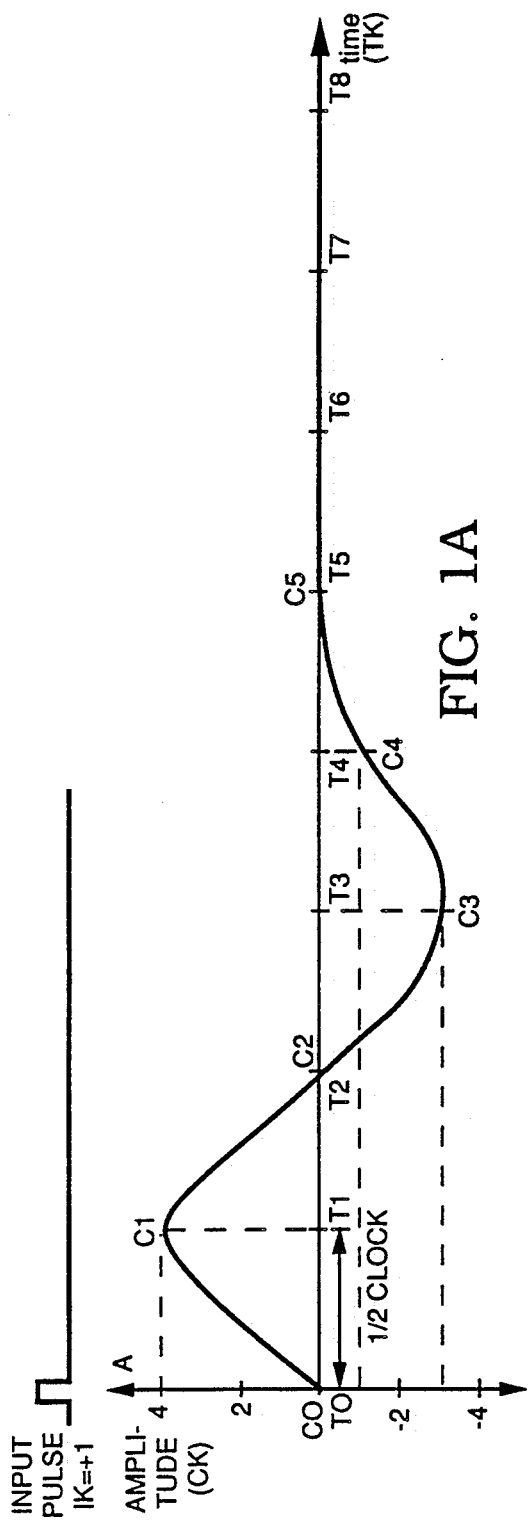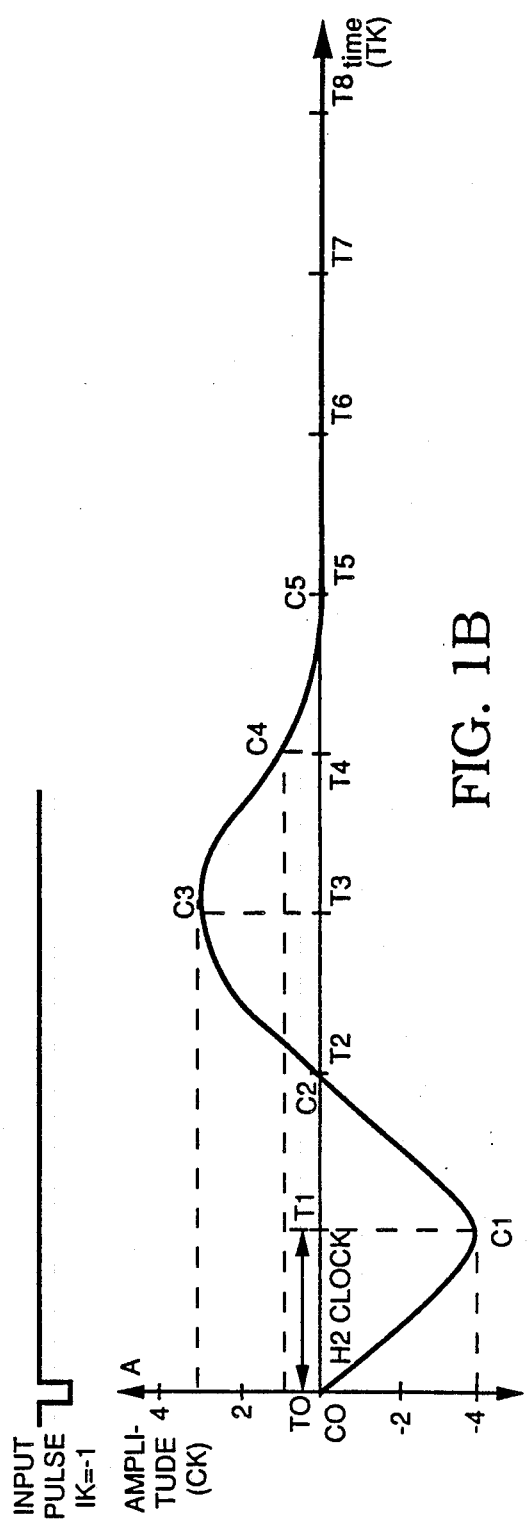

FAST DECISION FEEDBACK DECODER FOR DIGITAL DATA

This invention relates generally to detection of digital data which has been transmitted over a signal transmission channel, and more particularly to decision feedback decoders operating at a high speed.

BACKGROUND OF THE INVENTION

When digital data are transmitted over a signal channel, they are known to suffer from intersymbol interference which is dependent on the particular channel response and the input data pattern. Examples of digital data transmission channels are microwave and satellite transmission channels, telephone communication lines, or magnetic recording/reproduction of digital data. In the above described type of channels the amplitude response in time domain to a single pulse has a ringing characteristic, which in turn results in superposition of otherwise unrelated, distinct input pulses. The foregoing undesirable effect causes amplitude variation, in turn causing incorrect amplitude detection at sampling time, and thus errors in the detected data bits.

As it is well known in the art, the signal received from a transmission channel is sampled at predetermined sampling intervals. The detected amplitude of each sample is digitized and compared to a threshold. When the digitized amplitude value exceeds the threshold, it is detected as a binary one, and when it is below the threshold it is detected as a binary zero. However, due to intersymbol interference, the sampled waveform represents a superposition of pulses. Therefore, for a given channel having a know amplitude response, the amplitude at each sampling time varies with the particular data pattern being decoded. Decision data decoders have been developed to correct for the intersymbol interference as follows. These known decoders store a predetermined number of previously decoded bit values, generally referred to as decisions, made by the decoder. These stored decisions are fed back to the decoder logic, which then makes the next decision about a particular sample value considering the previous decision values and particular channel characteristics. More particularly, the known decision feedback decoders provide a correction value for each detected bit, and adjust the threshold value accordingly, thereby compensating for the intersymbol interference.

The operation speed of existing decision feedback decoders is limited to that attainable by the logic circuitry which makes the decisions. These known decision feedback decoders are capable of making one decision, that is to decode one sample of the transmitted signal, within one clock cycle.

The decision feedback decoder in accordance with the preferred embodiment of the invention has two parallel signal paths. The first and second path both receive sequentially an input data stream, but only every other data bit of the stream is input into a first logic circuit in the first path to be decoded thereby. The first logic circuit makes a decision about the value of the received bit by comparing that value to a threshold. The first path has first storage means for storing a predetermined number of previous decisions, that is bit values previously decoded by the first logic circuit. The first logic circuit adjusts the threshold before making any new decision, on the basis of previously made stored decision values and the known channel response.

The second signal path has a second logic circuit which receives the same input data bit simultaneously with the first logic circuit, and it receives a second, subsequent data bit. The second data path has a second storage means for storing a predetermined number of previous decisions made by the second logic circuit. Both logic circuits receive the stored decisions which are fed back from both the first and second storage means. The second logic circuit outputs every second decision made thereby, which decisions determine the values of input data bits alternating with those received by the first logic circuit.

In operation, the first logic circuit, which receives every other bit of the input bit sequence, makes a first decision about a particular input bit within one clock cycle, and it outputs that decision. The second logic circuit, which receives simultaneously two subsequent input bits, makes two subsequent decisions within the same clock cycle, and it outputs the second made decision. It utilizes the first made decision within that clock cycle internally for providing the second decision. It is a particular advantage of the invention that the second logic circuit provides two subsequent decisions within the same clock cycle, and that it considers the first made decision as a previous decision during the second decision making process. The thusly detected data bits are taken alternatively from the respective outputs of the first and second logic circuit, where each first decision within a clock cycle is taken from the first logic circuit, and each second decision made within the same clock cycle is taken from the second logic circuit. The threshold which is utilized in the decision making process is continually adjusted for each decision, depending on the previous decision values and particular channel response characteristics.

In the preferred embodiment of the invention the second logic circuit is implemented by a relatively large capacity RAM, and the first logic circuit by a relatively small capacity RAM. For example the capacity of the second logic circuit RAM is 16 Kbits, and of the first logic circuit RAM is 512 bits. The input signal from the transmission line is a playback signal which is obtained by recording and subsequently playing back a digital signal from a magnetic medium. The first signal path has a first analog-to-digital (A/D) converter which receives the playback signal and samples it at a first clock signal. The second signal path has a second A/D converter which samples the playback signal at a second clock signal, which is delayed with respect to the first clock signal by one half clock cycle. Thus each A/D converter outputs digitized samples at one half of the combined sampling rate at which the resulting subsequent samples in both signal paths are obtained. Alternatively, the logic circuits may be implemented by combinational logic, where the second logic circuit will have approximately twice the number of logic elements utilized by the first logic circuit.

BRIEF DESCRIPTION OF THE DRAWINGS

FIGS. 1A and 1B show examples of particular transmission channel responses to a positive and negative input pulse.

FIGS. 4A to 4J show timing diagrams associated with the operation of the decoder shown in FIG. 3.

DETAILED DESCRIPTION

Figure 2:
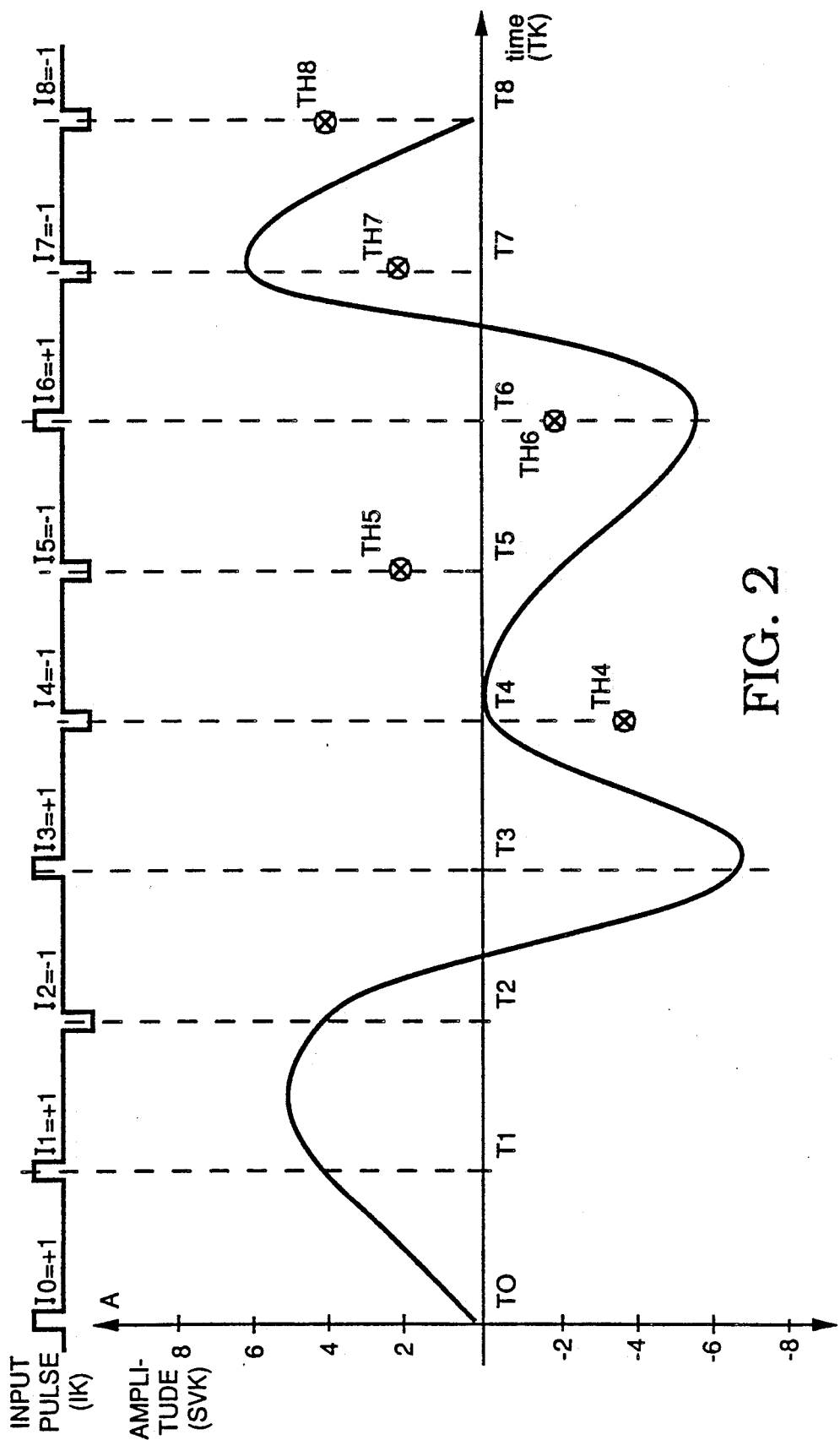
FIG. 2 shows an example of a response by the particular transmission channel of FIGS. 1A, 1B, to a particular input pulse sequence.

To facilitate the following description of the decision feedback decoder in accordance with the preferred embodiment of the invention, first an example of a transmission channel having a known amplitude response to an input pulse will be described herein. That particular transmission channel is utilized to transmit data to be decoded by the decoder. As it has been previously mentioned, such channel response causes intersymbol interference of the input data bits transmitted thereby. Decision feedback decoders in general, and the decoder of the invention in particular, reduce the effect of the intersymbol interference on the decoded data.

With further reference to FIG. 1A it shows an example of a particular amplitude response of a transmission channel in time domain, to a single positive input pulse $Ik = +1$, representing a binary one, and FIG. 1B shows a response to a single negative input pulse $Ik = -1$, representing a binary zero. Along the time axis there are plotted particular points in time T0 to Tn occurring at timing intervals, which in the preferred embodiment correspond to one half of a clock cycle utilized to synchronize the operation of the decoder, as it will follow from the description below.

As it is seen from FIG. 1A, when a positive pulse $Ik = +1$ is applied to the transmission channel at time T0, it provides an increasing amplitude from $C0 = 0$ at T0, to a peak $C1 = 4$ at time T1. Thereafter the amplitude decreases to $C2 = 0$ at time T2, and continues to decrease until time T3, when it has a negative peak $C3 = -3$. The amplitude thereafter increases towards less negative values, and reaches $C4 = -1$ at time T4, and then $C5 = 0$ at T5, whereafter it stays at zero. The channel response to a negative input pulse $Ik = -1$ is shown in FIG. 1B. It is seen that the amplitude values in FIG. 1B have the same magnitude but opposite sign, that is they are inverted, with respect to the values shown in FIG. 1A. To facilitate further description, the respective amplitude values C0 to C5 at respective points in time T0 to T5 for the channel response to $Ik = -1$, as shown in FIG. 1A, are depicted in TABLE A below. It will be understood that in this example the amplitude values C0 to C5 have been deliberately selected as integers to facilitate the description. An actual channel response obtained by measurement will likely have non-integer amplitude values.

TABLE A

| | Time (Tk) | T0 | T1 | T2 | T3 | T4 | T5 |
|---|---|---|---|---|---|---|---|
| ADJUSTMENT (Ck) for Ik = +1 | | | | | | | |
| (1) | C0 | 0 | | | | | |
| (2) | C1 | | 4 | | | | |
| (3) | C2 | | | 0 | | | |
| (4) | C3 | | | | −3 | | |
| (5) | C4 | | | | | −1 | |
| (6) | C6 | | | | | | 0 |

As it is seen from FIGS. 1A, 1B and TABLE A, in this example there is a one timing interval delay between the input and output of the transmission channel, and each amplitude peak $C1 = 4$ or $C1 = -4$ at T1 corresponds to an input pulse $Ik = +1$ or $Ik = -1$, respectively. As it is well known in the art, a transmission channel having an ideal response would transmit each input pulse unchanged. Consequently, in an ideal channel there would be no intersymbol interference, and any sequence of transmitted pulses would correspond to the channel input. Any deviation from such ideal output is due to so-called ringing effect, as shown in FIGS. 1A, 1B, which in turn causes undesirable intersymbol interference.

Now an example of a response provided by the above described transmission channel to a known sequence of input pulses Ik=I0 to I8 will be described with reference to FIG. 2 and TABLE B, shown below. Due to the intersymbol interference the amplitude values SVk=SV0 to SV8 at any point in time Tk=T0 to T8 will be influenced by the previously described channel response values Ck to the previously transmitted pulses by the channel. Therefore at each point in time Tk the resulting amplitude SVk is obtained as a superposition of amplitudes Ck, resulting from the particular channel response to particular pulses previously transmitted by the channel. As it will follow from further description, the decision feedback decoder of the preferred embodiment provides a threshold adjustment to compensate for the values Ck.

TABLE

| | | T0 | T1 | T2 | T3 | T4 | T5 | T6 | T7 | T8 |
|---|---|---|---|---|---|---|---|---|---|---|
| (1) | TIME (Tk) | T0 | T1 | T2 | T3 | T4 | T5 | T6 | T7 | T8 |
| (2) | INPUT DATA (Ik) | +1 | +1 | −1 | +1 | −1 | −1 | +1 | −1 | −1 |
| | ADJUSTMENT (Ck) | ↓ | ↓ | ↓ | ↓ | ↓ | ↓ | ↓ | ↓ | ↓ |
| (3) | C0 | 0 | 0 | 0 | 0 | 0 | 0 | 0 | 0 | 0 |
| (4) | C1 | | +4 | +4 | −4 | +4 | −4 | −4 | +4 | −4 |
| (5) | C2 | | | 0 | 0 | 0 | 0 | 0 | 0 | 0 |
| (6) | C3 | | | | −3 | −3 | +3 | −3 | +3 | +3 |
| (7) | C4 | | | | | −1 | −1 | +1 | −1 | +1 |
| (8) | AMPLITUDE VALUE (SVk) | 0 | +4 | +4 | −7 | 0 | −2 | −6 | 6 | 0 |
| (9) | ADJUSTED | | | | −4 | 2 | −2 | 2 | 4 | |

TABLE-continued

THRESHOLD (THk)

To facilitate description of the channel response depicted in the example of FIG. 2, the various amplitude response values C0 to C4 from TABLE A are shown in TABLE B as contributing to the superposed amplitude value SVk at each point in time Tk. All the particular values given in TABLE B are correlated with corresponding values shown in the example of FIG. 2.

With further reference to TABLE B, horizontal row 1 shows time intervals T0 to T8, at which input pulses I0 to I8, indicated in row 2, are sequentially received. Thus pulse I0 = +1 is received at time T0; pulse I1 = +1 is received at time T1; pulse I2 = −1 is received at time T2; etc., as it is also shown in FIG. 2. As is has been indicated previously, each input pulse Ik = +1 corresponds to a binary one, and Ik = −1 to a binary zero of the input data transmitted by the channel. The amplitude response, shown in FIG. 2, to the above indicated input pulse sequence, results from the above-described intersymbol interference. It results from superposition of the respective contributions of the responses shown in FIGS. 1A and 1B, to each respective input pulse, as it will be described below in more detail.

Rows 3 to 7 of TABLE B depict respective amplitude response contributions Ck from a presently received pulse Ik, as well as from previously received pulses. As it is seen from comparison, rows 3 to 7 in TABLE B correspond to rows 1 to 5 of TABLE A. Because in the presently described embodiment there is a one interval delay of the response to an input pulse, the amplitude contribution C0 at a time Tk, in response to a pulse received at that time Tk is C0=0. C1 depicts the respective amplitude contribution obtained in response to an input pulse received at time T(k-1), that is, preceding Tk by one time interval, and has a value of +4 or −4. C2 depicts the amplitude obtained in response to a pulse received at T(k2), that is, preceding Tk by two time intervals, and it has a value C2=0. The following amplitude C3 has a value −3 to +3, and C4 has a value of −1 or +1. It is seen from the example of the channel response depicted in FIGS. 1A, 1B and TABLE A, that each previous pulse contributes to the amplitude response only during four consecutive intervals, as it is also shown by the amplitude values C0 to C4 in TABLE B.

The actual amplitude value SVk at each point in time Tk, in response to the particular sequence of input pulses Ik is obtained as follows. The values in rows 3 to 7 in TABLE B are algebraically summed. The resulting sums SVk are indicated in row 8, and they represent the actual digital data values corresponding to respective amplitude values of the response curve in FIG. 2 at the above-indicated times.

As an example, and with further reference to both FIG. 2 and TABLE B, the amplitude value SVk, for example at T5, is obtained as follows. The contribution of input pulse I5 = −1 received at T5 is C0=0; the contribution of the immediately preceding pulse I4 = −1 received at T4 is C1 = −4; the contribution of pulse I3 = +1 received at T3 is C2=0; the contribution of pulse I2 = −1 received at T2 is C3 = +3; and the contribution of pulse I1 = +1 received at T1 is C4 = −1. Thus at time T5 the value $SV5 = -4 + 3 - 1 = -2$, as it is also seen from both TABLE B, row 8, and FIG. 2.

Now a block diagram of the preferred embodiment of the decision feedback decoder in accordance with the invention will be described with reference to FIG. 3. The decoder in FIG. 3 has two parallel signal path 12, 14. The first signal path 12 has a first analog-to-digital (A/D) converter 16, having an input connected to an input line 10, and an output connected via line 18 to a first input J1 of a first logic circuit 24. A clock line 46 applying a first clock signal CLK1 is connected to clock the digital data out from converter 16, and a clock line 48 applying a second clock signal CLK2 is connected to clock the digital data out from converter 32. The output of logic circuit 24 is connected via line 25 to first series D flip-flops 26a to 26m, of which two flip-flops 26a and 26b are utilized in the presently described embodiment. The respective outputs of all first series flip-flops are connected to a common bus 30.

The second signal path 14 has a second A/D converter 32 having an input connected to input line 10. An output of converter 32 is connected via line 33 to a D flip-flop 34, whose output is connected via line 35 to a first input I1 of a second logic circuit 36. The output from logic circuit 36 is connected to second series D flip-flops 38a to 38m. In the presently described embodiment two such flip-flops 38a and 38b are utilized. The respective outputs of all second series flip-flops are connected to the common bus 30. A second input I2 of the second logic circuit 36 is connected via line 18 to the output of A/D converter 16 in the first signal path. A second input J2 of the first logic circuit 24, and a third input I3 of the second logic circuit 36 are both connected to the common bus 30. A first output data line 27 from the decision feedback decoder of FIG. 3 is connected to an output of the first flip-flop 26a in the first parallel data path. A second output data line 39 is connected to an output of the first flip-flop 38a in the second parallel data path. As it is seen from FIG. 3, CLK1 is used to synchronize the operation of both signal paths 12, 14, while CLK2 is only utilized to sample the input signal in the A/D converter 32.

In operation, an input signal is received on line 10 from a data transmission channel, for example having a channel response as it has been above described with reference to FIGS. 1A, 1B and TABLE A. For example, the signal on line 10 may be applied from a magnetic recording/playback channel, where digital data has been recorded on a magnetic medium and played back therefrom. The input signal on line 10 is sampled by A/D converter 16, at clock signal CLK1 on line 46 and by A/D converter 32 at clock signal CLK2 on line 48 as follows. Both clock signals have the same frequency, but the clock signal on line 48 is delayed with respect to the clock signal on line 46 by one half clock cycle. The timing relationship of the respective first and second clock signals CLK1 and CLK2 is shown in FIGS. 4A, 4B.

With further reference to the timing diagram in FIG. 4C, it shows the respective digital data values SVk on line 9, which are clocked out from A/D converter 16 at the positive edges of the first clock CLK1 applied on line 46. FIG. 4D shows respective data values SVk on line 33 which are clocked out from A/D converter 32 at the positive edges of the second clock CLK2. As it is seen from FIGS. 4C and 4D, the occurrence of data SVk on line 9 precedes in time the occurrence of the data on line 33 by one half clock cycle. Thus the occurrence of the data on line 9 alternates with the occurrence of the data on line 33. The data on line 33 is delayed by one half of clock cycle in flip-flop 34m, as it is depicted in the timing diagram of FIG. 4F, showing the data on line 35. The data on line 9 is delayed by one full clock cycle in flip-flop 8, as it is depicted in the timing diagram of FIG. 4E, showing the data on line 18. In the timing diagram of FIGS. 4C to 4F the data values SVk are indicated as occurring on each line 9, 33, 18 and 35, respectively, and these values correspond to the values SVk in TABLE B.

Figure 3:
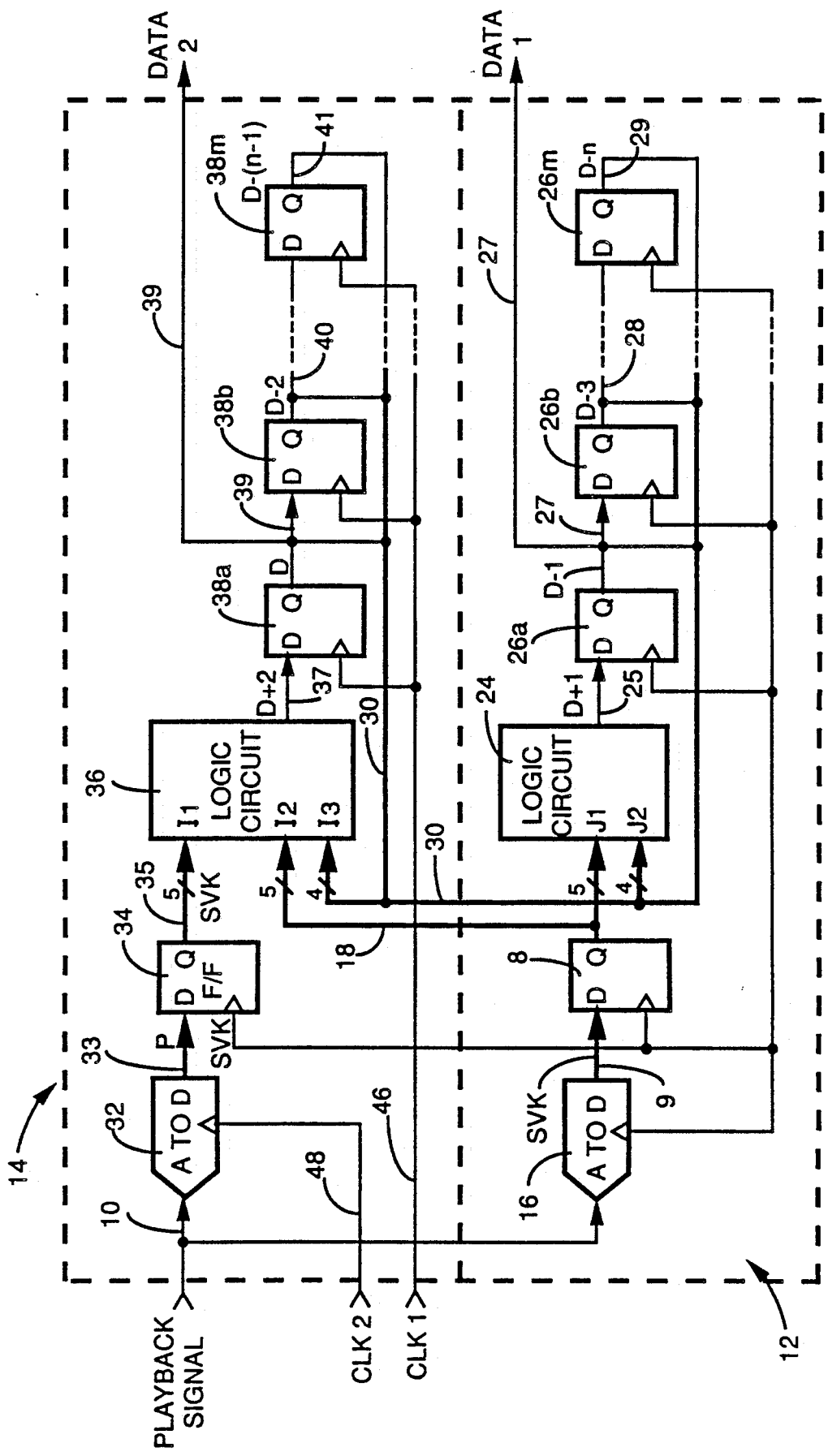
FIG. 3 shows a block diagram of a preferred embodiment of the decision feedback decoder of the invention.

With further reference to the block diagram of FIG. 3, the data SVk on line 18 is applied to the first logic circuit 24, simultaneously with the data on lines 18 and 35 applied to the second logic circuit 36. The logic circuit 24 decodes sequentially each received data value SVk, and it outputs on line 25 a decision determining that data value. That decision is +1, or −1, that is, it indicates, whether the particular decoded data value represents a binary one or a binary zero. Each decision on line 25 is stored in each series flip-flop 26a to 26m for one clock cycle. As it has been previously indicated, the operation of both logic circuits 24, 36 and of all the series flip-flops in both signal paths 12, 14 is synchronized by CLK1 on line 46. The thusly stored decisions are applied via bus 30 to both the first and second logic circuit 24, 36, and they are utilized in the decision making process, as it will be described later. In the preferred embodiment the first logic circuit 24 is implemented by a 512-bit random access memory (RAM), and it is addressed by 5 address lines via line 18, and by 4 address lines via line 30. It has one output line 25. The second logic circuit 36 is implemented by a 16-Kbit RAM, with at least 14 address lines, of which 5 address lines correspond to line 35, 5 address lines to line 18, and 4 address lines to line 30. The RAM's 24, 36 are controlled by a microprocessor (not shown) in a well known manner.

As it has been previously described, the second logic circuit 36 receives two subsequent input signal values, that is SVk on line 18, and SV(k+1) on line 35, simultaneously with the signal value SVk on line 18 received by the first logic circuit 24. During each clock cycle, the logic circuit 24 makes and outputs a decision D+1 on line 25. During the same clock cycle logic circuit 36 makes two subsequent decisions, of which the first decision corresponds to the decision on line 25, however, it is made independently therefrom. Logic circuit 36 utilizes that first made decision internally for making a subsequent decision D+2 within the same clock cycle, but only that subsequent decision is output therefrom on line 37. The decision making operation by both logic circuits 24, 36 will be described later with reference to the respective flow charts shown in FIGS. 5 and 6.

For the purpose of this example, the most recent decision which has already been made is indicated as decision D on line 39 at the output of the first series flip-flop 38a in signal path 14. Decision D−1 immediately preceding decision D is on line 27 at the output of the first series flip-flop 26a in signal path 12. Decision D−2, which immediately precedes decision D−1 is on line 40 at the output from the second series flip-flop in signal path 14. Decision D+1 on line 25 at the output from logic circuit 24 is a most recent decision which is about to be made, and decision D+2 on line 37 at the output from the second logic circuit 36 is a decision about to be made, following decision D+1.

The respective subsequent decisions provided by logic circuit 36 are stored for one clock cycle in each series flip-flop 38a to 38m and they are output via the common bus 30 to both logic circuits 24, 36 and are utilized in the decision making process. It follows from the foregoing description with reference to FIG. 2 and TABLE B, that in the present example the particular sequence of digital input signal values SVk received on lines 18 and 35, respectively, is 0, +4, +4, −7, 0, −2, −6, +6 and 9, as it is depicted in line 8 of TABLE B. It also follows from the above disclosure with reference to FIG. 3 and the timing diagram in FIGS. 4A to 4E, that while only every other sequential data value SVk is applied to the first logic circuit 24, all the sequential data values are applied to the second logic circuit 36. Because of the much larger memory capacity of the second logic circuit 36, it is capable of operating at a substantially faster rate and thus is capable of making two subsequent decisions about the input data during one clock cycle. The first logic circuit, which has a substantially smaller memory capacity operates at about one-half of the rate when comparing to logic circuit 36.

The subsequent decisions which are output by the first and second logic circuit are alternatively taken from the output line 27 of the first series flip-flop 26a in the first data path 12, and from the output line 39 of the first series flip-flop 38a in the second path 14. Thus to provide decision D+1, logic circuit 24 utilizes the input signal value SVk on line 18, and 2m previous decisions received on bus 30. In the preferred embodiment four previous decisions D, D−1, D−2 and D−3 are utilized. As it is seen from FIg. 3, and is also depicted in he timing diagrams in FIGS. 4F to 4I, the most recent decision D is applied on line 39 from flip-flop 38a, decision D−1 on line 27 from flip-flop 26a, decision D−2 on line 40 from flip-flop 38b, and decision D−3 on line 28 from flip-flop 26b. The values +1 or −1 of these previous decisions pertaining to each SVk value occurring on lines 18 or 33 at a particular point in time Tk are shown in parenthesis in FIGS. 4F to 4I.

Figure 5:
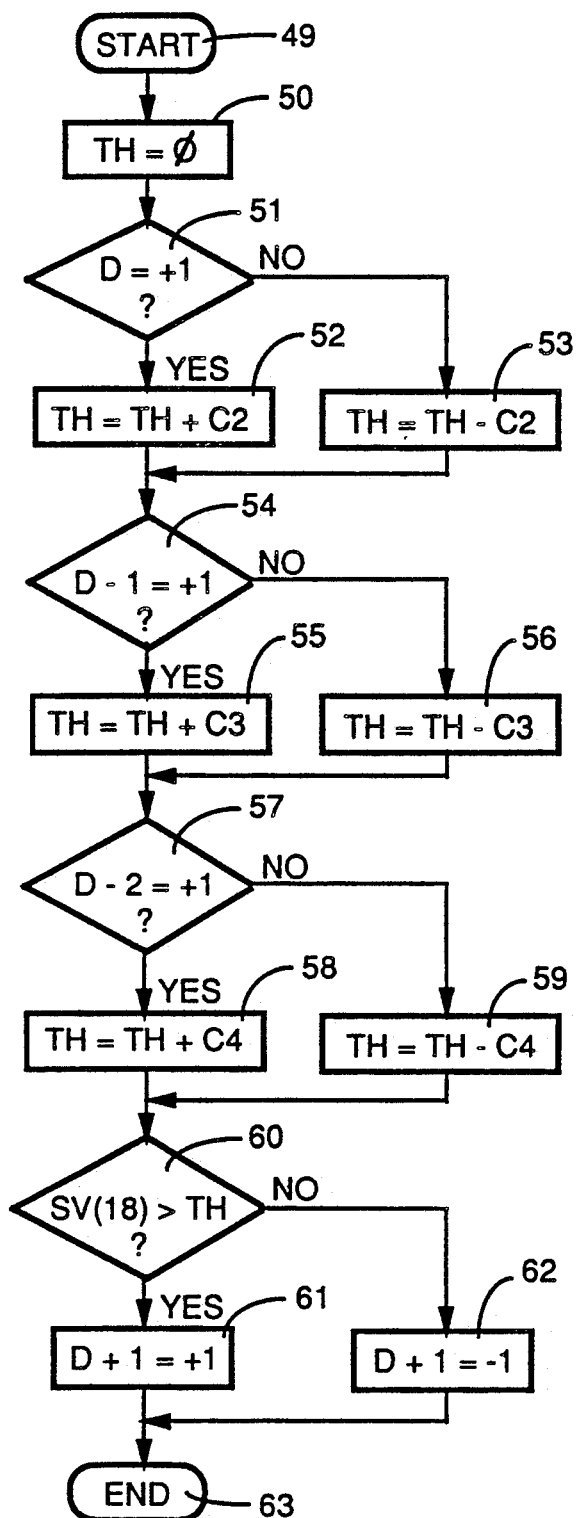
FIG. 5 is a flow chart depicting an example of operation of the first logic circuit 24 of FIG. 3.

Now the operation of the first logic circuit 24 of FIG. 3 will be described with reference to the flow chart shown in FIG. 5, followed by the description of operation of the second logic circuit 36 with reference to flow chart of FIG. 6. As it has been previously described, logic circuit 24 provides subsequent decisions D+1 determining the bit value +1 or −1 of sequentially received input signal values SVk on line 18 from the A/D converter 16 in the first signal path 12. Flow chart of FIG. 5 shows the sequence of steps performed by the logic circuit 24 to obtain decision D+1. As it has been previously described with reference to FIG. 3, logic circuit 24 outputs on line 25 a value +1 or −1 corresponding to that decision.

With further reference to FIG. 5, after initialization, circuit 24 resets the threshold value TH which is utilized for comparison with data values, as previously described, to TH=0. As it is seen from the flow chart, the circuit determines step-wise, starting with the most recent previously made decision D, whether it has a value +1 or −1. If D=+1 the current threshold value TH is adjusted by adding a corresponding adjustment value Ck from TABLE A. If D=−1, a corresponding adjustment value Ck is subtracted from the threshold TH. It is understood that TABLE A shows values Ck obtained in response to a positive input pulse Ik=+1. As it has been previously described, the values Ck obtained in response to Ik=−1 are inverted with respect to those shown in TABLE A. Therefore it will be understood that for compensation purposes these adjustment values Ck obtained in response to a previous input pulse Ik= +1 are added to the threshold, and the same values Ck are subtracted from the threshold when compensating for a previous input pulse Ik= −1.

As it is seen for example from TABLE B, any decision to be made at any time Tk is not influenced by C0 or C1. For example, a decision D+1 to be made at time T5 is related to an input pulse received at T4, which pulse in this example is I4= −1. Thus with further reference to FIG. 5, as shown by block 51, the logic circuit 24 determines whether the most recent decision D= −1. If YES, the threshold value is adjusted by adding the value C2 (block 52). If NO, the value C2 is subtracted from TH (block 53). In the example of TABLE B the contribution of C2 at time T5 is Cd=0.

The above process is now repeated for a previous decision D−1, as depicted by blocks 54 to 56. In the above-indicated example, in TABLe B, decision D−1=1 −1 is made at time T3 and it is related to input pulse I2= −1 received at time T2. The contribution of pulse I2 at time T5 has a value C3= −(−3)= +3. Thus the new threshold according to block 56 will be adjusted to TH=TH+3= +3.

The foregoing process is repeated again for decision D−2, as it is shown by blocks 57 to 59 of FIG. 5. Thus in the present example, decision D−2 made at time T2 corresponds to input pulse I1= +1, received at time T1, as shown in TABLE B. The contribution of that pulse at time T5 is C4= −1. The threshold is thus adjusted as shown by block 58 to $TH=TH-1=+3-1=+2$, which adjusted value is shown in TABLE B, row 8, column T5.

As it is depicted by block 60, the thusly adjusted threshold value is compared with the signal value SVk received on line 18 by the logic circuit 24 at time T5. As it is seen from line 8 of TABLE B, at T5 SVk= −2. Because in this example THk= +2 is greater than SVk= −2, the decision $D+1=-1$, as depicted by block 62.

Now the operation of the second logic circuit 36 of the block diagram of FIG. 3 will be described with reference to the flow chart shown in FIG. 6. The purpose of the circuit operation depicted in FIG. 6 is to make a decision D+2, immediately following the decision D+1. As it is seen from comparing the respective flow charts of FIGS. 5 and 6, their operations are similar. A major difference however is that circuit 36 operates approximately two times faster than circuit 24, and consequently it provides two subsequent decisions within the same time period during which circuit 24 provides only one decision. With further reference to FIG. 6, circuit 36 is initialized as it is shown by block 70. Thereafter the previously described process depicted in he flow chart of FIG. 5 is utilized, as shown by block 71, to obtain decision D+1, however at a substantially faster rate than it is provided by circuit 24.

Thereafter the threshold value TH is set to zero, as shown by block 72. As depicted by block 73, the circuit further determines whether the previously made decision $D+1=1$. If YES, the threshold value is adjusted by adding the value C2 from TABLE A, as it is shown by block 74. If NO, the value C2 is subtracted from TH, as it is shown by block 75.

Blocks 76, 77 and 78 show similar steps for determining the value of decision D and adjusting the threshold accordingly.

The foregoing steps are again similar to those previously described and shown by blocks 79 to 81, to determine the value of previous decision D−1 and to adjust the threshold.

Block 82 compares the thusly obtained adjusted threshold value Thk to the signal value SVk on line 35 received by the logic circuit 36 at time T6. If THk is larger than SVk, the decision $D+2=+1$, if THk is smaller than SVk, the decision $D+2=-1$, as it is depicted by blocks 83, 84 respectively.

Figure 6:
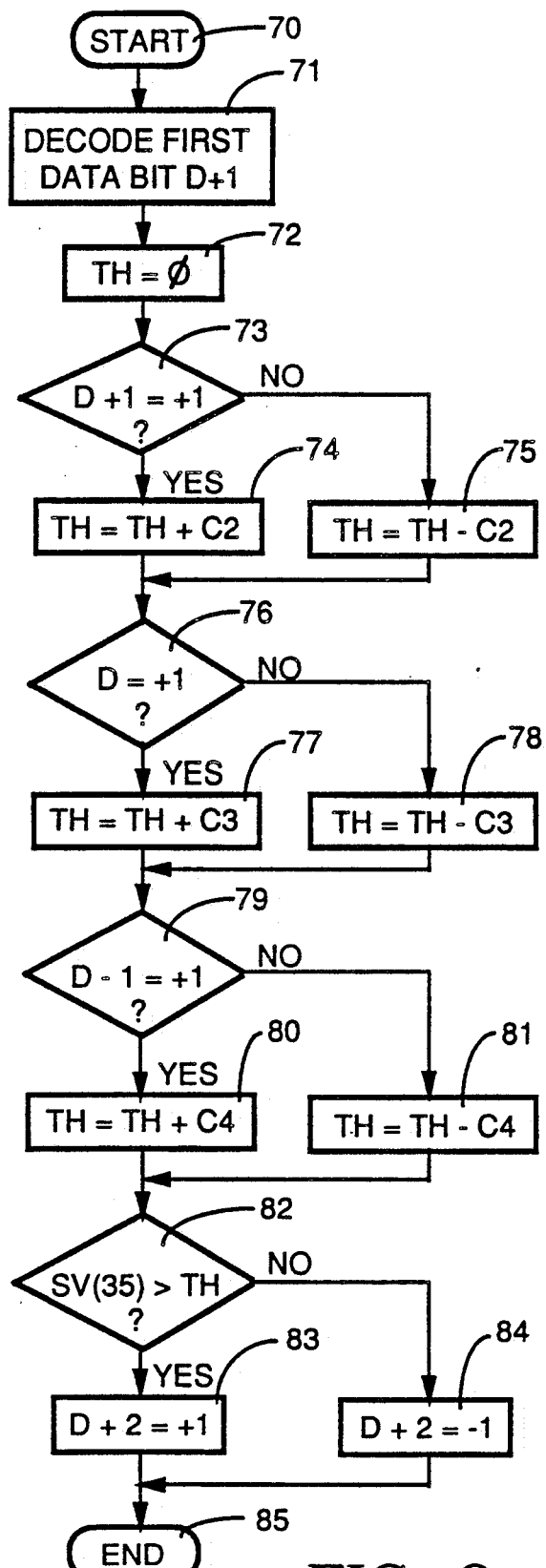
FIG. 6 is a flow chart depicting an example of operation of the second logic circuit 36 of FIG. 3.

It will become apparent from the foregoing description that the flow charts of FIGS. 5 and 6 may contain further steps which may adjust the threshold by further compensation values Ck, depending on the particular channel characteristics. It will also be understood that the above-described operations depicted by flow charts of FIGS. 5 and 6 are repeated for each decision stored at a memory location of each RAM 24, 36.

While the invention has been shown and described with particular reference to a preferred embodiment thereof, it will be understood that variations and modifications in form and details may be made therein without departing from the scope of the invention as defined in the appended claims.

I claim:

1. A decision feedback apparatus for decoding a digital data stream transmitted by a signal transmission channel, comprising:
    a first signal path having a first logic means receiving sequentially digital values corresponding to every other data bit of said transmitted data stream, for providing and outputting therefrom a decision determining a value of each said corresponding data bit, and a first storage means for storing a predetermined number of consecutive previous decisions provided by said first logic means;
    a second signal path, parallel with said first path, having a second logic means receiving sequentially digital values corresponding to each data bit of said transmitted data stream, providing a decision determining a value of each said corresponding data bit, and outputting a decision determining the value of each said decision provided by said first logic means, and a second storage means for storing a predetermined number of consecutive previous decisions provided by said second logic means; and
    said first and second storage means both applying said previous decisions stored therein to both said first and second logic means.

2. The apparatus of claim 1 wherein said second logic means provides each said decision at substantially twice the rate of each said decision provided by said first logic means.

3. The apparatus of claim 1 wherein said second logic means comprises a memory means of a relatively large capacity with respect to a memory comprised by said first logic means.

4. The apparatus of claim 1 wherein said first and second logic means are implemented by combinational logic means, and wherein said second logic means comprises substantially twice the number of logic elements comprised by the first logic means.

5. The apparatus of claim 1, wherein a signal from said transmission channel is sampled with a first and a second clock signal, respectively, both clock signals having the same frequency, said second clock signal lagging said first clock signal by one half clock cycle, and wherein said samples obtained from said first clock signal correspond to said digital values received by said first logic means, and said samples obtained from both said first and second clock signal correspond to said digital values received by said second logic means.

6. The apparatus of claim 5 wherein said first logic means provides each said decision within one clock cycle, and said second logic means provides two subsequent decisions within the same clock cycle.

7. The apparatus of claim 5 wherein said transmission channel has a known amplitude response at each point in time to an input pulse representing a logic one bit, and to an input pulse representing a logic zero bit, respectively, and wherein said first and second logic means adjust said respective decisions to compensate for said known channel response.

8. The apparatus of claim 7 wherein said first and second logic means provide each said decision by comparing each said received digital value with a threshold value, and wherein they adjust said threshold value to compensate for said known channel response prior to each comparison.

9. A decision feedback apparatus for decoding a digital data stream obtained by sampling an input signal transmitted by a transmission channel, comprising:
   a first analog-to-digital converter coupled in first data path for sampling said input signal with a first clock signal;
   a second analog-to-digital converter coupled in a second data path, parallel with said first data path, for sampling said input signal with a second clock signal having the same frequency and lagging said first clock signal by one half of a clock cycle;
   first logic means coupled in said first signal path for receiving subsequent samples form said first analog-to-digital converter, and for providing and outputting therefrom subsequent decisions determining a value of each said sample received thereby;
   first storage means coupled in said first signal path for storing a predetermined number of previous decisions provided by said first logic means;
   second logic means coupled in said second signal path for receiving subsequent samples from both said first and second analog-to-digital converter, providing subsequent decisions determining a value of each sample received thereby, and outputting respective decisions determining the value of each said received sample which alternates with said samples received by said first logic means;
   second storage means coupled in said second signal path for storing a predetermined number of previous decisions outputted by said second logic means; and
   means for applying said previous decisions stored by both said first and second storage means to both said first and second logic means.

10. The apparatus of claim 9 wherein said first logic means provides each said decision within one clock cycle, and said second logic means provides two subsequent decisions within the same clock cycle.

11. A decision feedback apparatus for decoding a digital data stream obtained by sampling an input signal transmitted by a transmission channel, which channel has a known amplitude response at each point in time to an input pulse representing a logic one bit, and to an input pulse representing a logic zero bit, comprising:

a first analog-to-digital converter coupled in a first signal path for sampling said input signal with a first clock signal;
   a second analog-to-digital converter coupled in a second signal path, parallel with said first signal path, for sampling said input signal with a second clock signal, said second clock signal having the same frequency and lagging said first clock signal by one half of a clock cycle;
   first logic means coupled in said first signal path for receiving subsequent samples from said first analog-to-digital converter, and for providing and outputting therefrom subsequent decisions determining a value of each said received sample by comparing with a threshold value, said first logic means further adjusting said threshold value to compensate for said known channel response prior to each comparison;
   first storage means coupled in said first signal path for storing a predetermined number of previous decisions provided by said first logic means;
   second logic means coupled in said second signal path for receiving subsequent samples from both said first and second analog-to-digital converter, providing subsequent decisions determining a value of each received sample by comparing with a threshold value, said second logic means further adjusting said threshold value to compensate for said channel response prior to each comparison, and outputting respective decisions determining the value of each said received sample which alternates with said samples received by said first logic means;
   second storage means coupled in said second signal path for storing a predetermined number of previous decisions outputted by said second logic means; and
   means for applying said previous decisions stored by both said first and second storage means to both said first and second logic means.

12. A method of decoding subsequent data bits of a digital data stream transmitted by a signal transmission channel, comprising the steps of:
   applying sequentially digital values corresponding to every other data bit of said transmitted data stream to a first logic means in a first data path;
   providing and outputting by said first logic means subsequent decisions determining respective values of each said corresponding data bit;
   storing a predetermined number of consecutive previous decisions provided by said first logic means;
   applying sequentially digital values corresponding to each said data bit of said transmitted data stream to a second logic means in a second data path, in parallel with said first data path;
   providing by said second logic means subsequent decisions determining respective values of each said corresponding data bit, and outputting each such decision which alternates with said decisions provided by said first logic means;
   storing a predetermined number of consecutive previous decisions provided by said second logic means; and
   applying to both said first and second logic means said stored previous decisions provided by both said first and second logic means.

13. The method of claim 12 wherein the step of providing each decision by said second logic means is provided at substantially twice the rate of the step of providing each decision by said first logic means.

14. The method of claim 12, wherein:
the step of applying sequentially digital values corresponding to every other data bit to a first logic means comprises sampling a signal from said transmission channel with a first clock signal, and applying said samples to said first logic means;
the step of applying sequentially digital values corresponding to each said data bit to a second logic means comprises sampling said signal from said transmission channel with a second clock signal having the same frequency and lagging said first clock signal by one half of a clock cycle, and applying said samples obtained at both said first and second clock signal to said second logic means.

15. The method of claim 14, wherein each said subsequent decision is provided by said first logic means within one clock cycle and two said subsequent decisions are provided by said second logic means within the same clock cycle.

16. The method of claim 14, wherein said transmission channel has a known amplitude response at each point in time to an input pulse representing a logic one bit, and to an input pulse representing a logic zero bit, respectively, and wherein each said step of providing a subsequent decision by said first and second logic means, respectively, comprises comparing each said received input signal value with a threshold value, and adjusting said threshold value to compensate for said known channel response prior to each comparison.

* * * * *